(12) United States Patent
Kim

(10) Patent No.: US 9,239,703 B2
(45) Date of Patent: Jan. 19, 2016

(54) FULL ADDER CIRCUIT

(71) Applicant: SK hynix Inc., Gyeonggi-do (KR)

(72) Inventor: Chang-Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 253 days.

(21) Appl. No.: 14/085,396

(22) Filed: Nov. 20, 2013

(65) Prior Publication Data

US 2015/0019610 A1    Jan. 15, 2015

(30) Foreign Application Priority Data

Jul. 10, 2013  (KR) .......................... 10-2013-0081017

(51) Int. Cl.
    *G06F 7/501*         (2006.01)
(52) U.S. Cl.
    CPC ..................... *G06F 7/501* (2013.01)
(58) Field of Classification Search
    CPC ..................................................... G06F 7/501
    See application file for complete search history.

(56) References Cited

U.S. PATENT DOCUMENTS

| | | | | |
|---|---|---|---|---|
| 4,583,192 A | * | 4/1986 | Cieslak | G06F 7/501 708/702 |
| 5,151,875 A | * | 9/1992 | Sato | G06F 7/501 708/626 |
| 5,687,107 A | * | 11/1997 | Igura | G06F 7/501 326/52 |
| 2008/0183784 A1 | * | 7/2008 | Lin | G06F 7/501 708/230 |

FOREIGN PATENT DOCUMENTS

| KR | 100570799 | 4/2006 |
|---|---|---|
| KR | 100622815 | 9/2006 |

* cited by examiner

*Primary Examiner* — Chuong D Ngo
(74) *Attorney, Agent, or Firm* — IP & T Group LLP

(57) ABSTRACT

A full adder circuit includes a first logical operation unit suitable for outputting an inverse of the second input signal and a first output signal corresponding to either a second input signal or the inverse of the second input signal in response to a first input signal, a second logical operation unit suitable for outputting an inverse of the first output signal and a sum signal corresponding to either the first output signal or the inverse of the first output signal in response to a carry input signal, and a third logical operation unit suitable for outputting a carry output signal in response to the inverse of the second input signal, the first output signal, the inverse of the first output signal, and the sum signal.

20 Claims, 3 Drawing Sheets

FULL ADDER CIRCUIT

CROSS-REFERENCE TO RELATED APPLICATIONS

The present application claims priority of Korean Patent Application No. 10-2013-0081017, filed on Jul. 10, 2013, which is incorporated herein by reference in its entirety.

BACKGROUND

1. Field

Exemplary embodiments of the present invention relate to a full adder circuit, and more particularly, to a full adder circuit outputting a carry value.

2. Description of the Related Art

A full adder circuit is a basic element widely used for a digital signal processing system including an operation system. The full adder circuit is well used in novel data processing scheme for rapidly processing a large amount of information signals. Circuit design is one of main concerns for a full adder circuit improving the data processing speed in an operation system or a data processing system rapidly processing a large amount of information signals.

FIG. 1 is a circuit diagram illustrating a full adder of prior art.

Referring to FIG. 1, the full adder is a logic circuit for generating 2 outputs for 3 input bits. The 3 input bits are 2 input signals SIG_A and SIG_B and a carry input signal SIG_$C_{IN}$. The full adder outputs a sum signal SIG_SUM and a carry output signal SIG_$C_{OUT}$. The full adder includes 2 XOR gates and 3 NAND gates.

As illustrated in FIG. 1, a first XOR gate XOR1 performs XOR operation for the input signals, for example, a first and a second input signals SIG_A and SIG_B and generates a logic high level signal, i.e., '1' when the input signals do not have the same logic level to each other. A second XOR gate XOR2 performs XOR operation for the output of the XOR gate XOR1 and the carry input signal SIG_$C_{IN}$ to generate the sum signal SIG_SUM. A first NAND gate NAND1 performs NAND operation for the output of the XOR gate XOR1 and the carry input signal SIG_$C_{IN}$. A second NAND gate NAND2 performs NAND operation for the first and second input signals SIG_A and SIG_B. A third NAND gate NAND3 performs NAND operation for the outputs of the first and second NAND gates NAND1 and NAND2 to generate the carry output signal SIG_$C_{OUT}$.

As disclosed above, the full adder of prior art includes 3 NAND gates, each of which has 4 transistors, which means that the full adder of prior art has 12 transistors and leads to inefficiency in terms of tendency of high-integration. A number of the full adder or the transistors increases as a number of input signals for operation increases, which may cause an increase in chip layout size and a threshold pass delay in the circuit and thus a concern on the performance of the data processing system.

SUMMARY

An exemplary embodiment of the present invention is directed to a full adder circuit capable of reducing chip layout size and improving data processing speed.

In accordance with an embodiment of the present invention, a full adder circuit includes a first logical operation unit suitable for outputting an inverse of the second input signal and a first output signal corresponding to either a second input signal or the inverse of the second input signal in response to a first input signal, a second logical operation unit suitable for outputting an inverse of the first output signal and a sum signal corresponding to either the first output signal or the inverse of the first output signal in response to a carry input signal, and a third logical operation unit suitable for outputting a carry output signal in response to the inverse of the second input signal the first output signal, the inverse of the first output signal, and the sum signal.

In accordance with another embodiment of the present invention, a semiconductor device includes a first logical operation unit suitable for outputting an inverse of the second input signal and a first output signal corresponding to either a second input signal or the inverse of the second input signal in response to a first input signal, a second logical operation unit suitable for outputting an inverse of the first output signal and a sum signal corresponding to either the first output signal or an inverse of the first output signal in response to a carry input signal, and a third logical operation unit suitable for outputting a carry output signal in response to the inverse of the second input signal, the first output signal, the inverse of the first output signal, and the sum signal.

DETAILED DESCRIPTION

Figure 1:
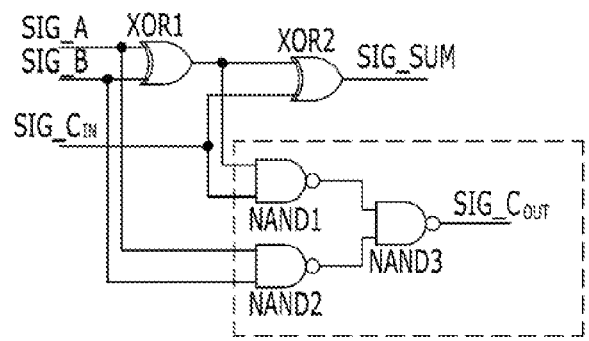
FIG. 1 is a circuit diagram illustrating a full adder of prior art.

Various exemplary embodiments of the present invention be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

The concept of the present invention may be applied to all semiconductor devices with plural units for logical operation despite disclosure is made as an example of a full adder of 3 inputs and 2 outputs. The 3 input bits are 2 input signals and a carry input signal. The 2 outputs are a sum signal and a carry output signal.

Figure 2:
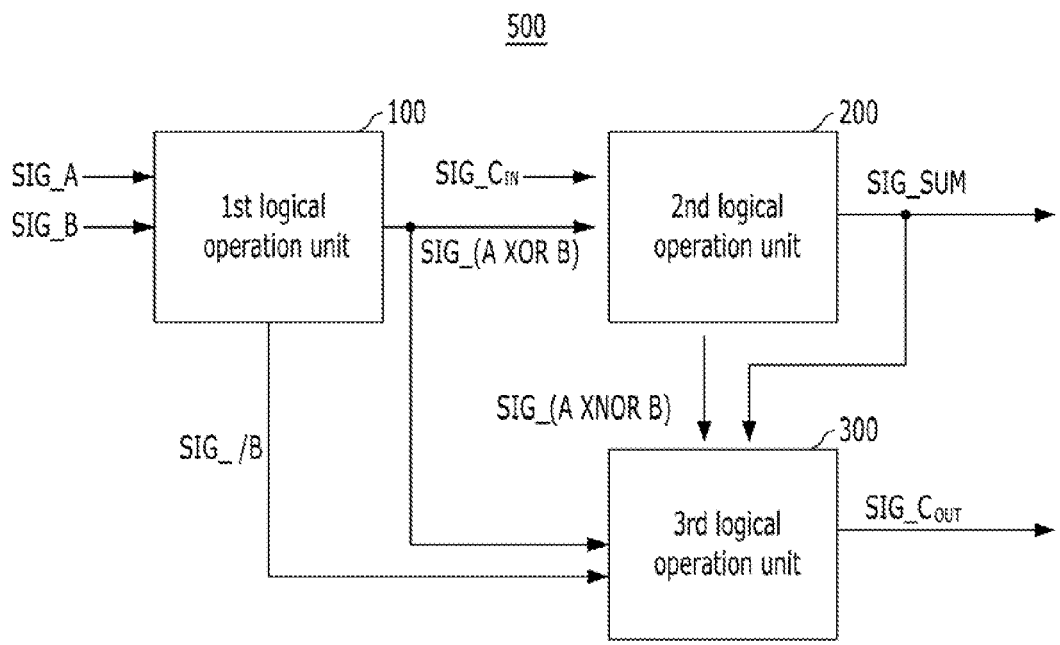
FIG. 2 is a block diagram illustrating a full adder circuit in accordance with an exemplary embodiment of the present invention.

FIG. 2 is a block diagram illustrating a full adder circuit in accordance with an exemplary embodiment of the present invention.

Referring to FIG. 2, a full adder circuit 500 in accordance with an exemplary embodiment of the present invention may include a first, second and third logical operation units 100, 200, and 300.

First and second input signals SIG_A and SIG_B are input to the first logical operation unit 100 to output the second input signal SIG_B or an inverse of the second input signal SIG_/B as a first output signal SIG_(A XOR B) based on the first input signal SIG_A.

The first output signal SIG_(A XOR B) and a carry input signal SIG_$C_{IN}$ are input to the second logical operation unit 200 to output the first output signal SIG_(A XOR B) or an inverse of the first output signal SIG_(A XNOR B) as a sum signal SIG_SUM based on the carry input signal SIG_$C_{IN}$.

The inverse of the second input signal SIG_/B, the first output signal SIG_(A XOR B), the inverse of the first output signal SIG_(A XNOR B) and the sum signal SIG_SUM are input to the third logical operation unit 300 to output a carry output signal SIG_$C_{OUT}$.

In detail, the first logical operation unit 100 performs XOR operation for the first and a second input signals SIG_A and SIG_B to output the first output signal SIG_(A XOR B). The second logical operation unit 200 performs XOR operation for first output signal SIG_(A XOR B) and the carry input signal SIG_$C_{IN}$ to output the sum signal SIG_SUM. The third logical operation unit 300 outputs the carry output signal SIG_$C_{OUT}$ based on the inverse of the second input signal SIG_/B, the first output signal SIG_(A XOR B), the inverse of the first output signal SIG_(A XNOR B) and the sum signal SIG_SUM.

According to an exemplary embodiment of the present invention, using an inverse of an input signal makes it possible for a full adder circuit to generate a carry value with minimum number of transistors.

Figure 3:
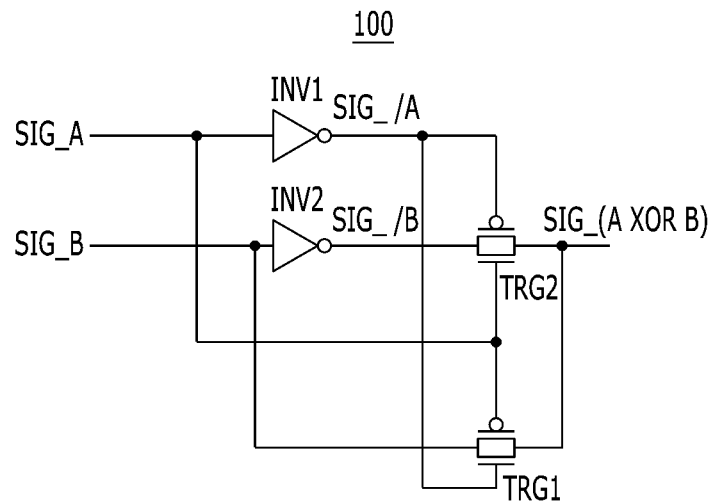
FIG. 3 is a circuit diagram illustrating a first logical operation unit in the full adder circuit of FIG. 2 in accordance with an exemplary embodiment of the present invention.

FIG. 3 is a circuit diagram illustrating the first logical operation unit 100 in the full adder circuit 500 of FIG. 2 in accordance with an exemplary embodiment of the present invention.

Referring to FIG. 3, the first logical operation unit 100 performs XOR operation for the first and a second input signals SIG_A and SIG_B. In detail, the first logical operation unit 100 includes first and second inverters INV1 and INV2 and first and second transmission gates TRG1 and TRG2.

The first and second inverters INV1 and INV2 invert the first and second input signals SIG_A and SIG_B to output the inverses of the first and a second input signals SIG_/A and SIG_/B, respectively. The first transmission gate TRG1 outputs the second input signal SIG_B as the first output signal SIG_(A XOR B) in response to the first input signal SIG_A and the inverse of the first input signal SIG_/A. The second transmission gate TRG2 outputs the inverse of the second input signal SIG_/B as the first output signal SIG_(A XOR B) in response to the first input signal SIG_A and the inverse of the first input signal SIG_/A.

In detail, the first output signal SIG_(A XOR B) is the second input signal SIG_B when the first input signal SIG_A has a logic "LOW" level. The first output signal SIG_(A XOR B) is the inverse of the second input signal SIG_/B when the first input signal SIG_A has a logic "HIGH" level.

As can be seen from FIG. 3 the first logical operation unit 100 takes either the input signal SIG_B or the inverse of the second input signal SIG_/B as the first output signal SIG_(A XOR B) that is a result of XOR operation to the first and second input signals SIG_A and SIG_B, which means that the first logical operation unit 100 for XOR operation for the input signals is implemented by taking one of the input signals as the output signal, namely the second input signal SIG_B in this embodiment, in consideration of XOR relationship of the input signals.

As disclosed above and can be seen from TABLE 1 below, the first output signal SIG_(A XOR B) is the second input signal SIG_B when the first input signal SIG_A is of value '0' corresponding to the "LOW" level. The first output signal SIG_(A XOR B) is the inverse of the second input signal SIG_/B when the first input signal SIG_A is of value '1' corresponding to the "HIGH" level.

TABLE 1

| SIG_A | SIG_B | SIG_/B | A XOR B | SIG_(A XOR B) |
|---|---|---|---|---|
| 0 | 0 | 1 | 0 | 0 |
| 1 | 0 | 1 | 1 | 1 |
| 0 | 1 | 0 | 1 | 1 |
| 1 | 1 | 0 | 0 | 0 |
| 0 | 0 | 1 | 0 | 0 |
| 1 | 0 | 1 | 1 | 1 |
| 0 | 1 | 0 | 1 | 1 |
| 1 | 1 | 0 | 0 | 0 |

Figure 4:
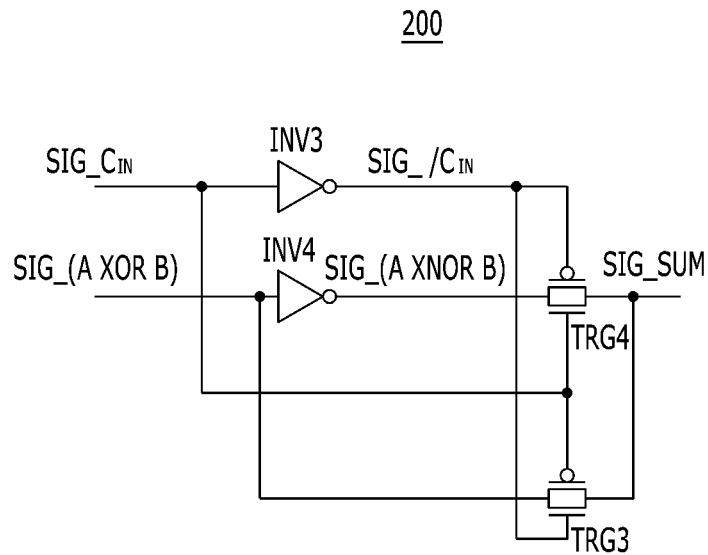
FIG. 4 is a circuit diagram illustrating a second logical operation unit in the full adder circuit of FIG. 2 in accordance with an exemplary embodiment of the present invention.

FIG. 4 is a circuit diagram illustrating the second logical operation unit 200 in the full adder circuit 500 of FIG. 2 in accordance with an exemplary embodiment of the present invention.

Referring to FIG. 4, the second logical operation unit 200 performs XOR operation for the first output signal SIG_(A XOR B) and the carry input signal SIG_$C_{IN}$. In detail, the second logical operation unit 200 includes a third and a fourth inverters INV3 and INV4 and a third and a fourth transmission gates TRG3 and TRG4.

The third and fourth inverters INV3 and INV4 invert the carry input signal SIG_$C_{IN}$ and the first output signal SIG_(A XOR B) to output the inverses of the carry input signal SIG_/$C_{IN}$ and the first output signal SIG_(A XNOR B), respectively. The third transmission gate TRG3 outputs the first output signal SIG_(A XOR B) as the sum signal SIG_SUM in response to the carry input signal SIG_$C_{IN}$ and the inverse of the carry input signal SIG_$C_{IN}$. The fourth transmission gate TRG4 outputs the inverse of the first output signal SIG_(A XNOR B) as the sum signal SIG_SUM in response to the carry input signal SIG_$C_{IN}$ and the inverse of the carry input signal SIG_/$C_{IN}$.

In detail, the sum signal SIG_SUM is the first output signal SIG_(A XOR B) when the carry input signal SIG_$C_{IN}$ is of logic "LOW" level. The sum signal SIG_SUM is the inverse of the first output signal SIG_(A XNOR B) when the carry input signal SIG_$C_{IN}$ is of logic "HIGH" level.

As can be seen from FIG. 4 similar to FIG. 3, the second logical operation unit 200 takes either the first output signal SIG_(A XOR B) or the inverse of the first output signal SIG_(A XNOR B) as the sum signal SIG_SUM that is a result of XOR operation to the first output signal SIG_(A XOR B) and the carry input signal SIG_$C_{IN}$, which means that the second logical operation unit 200 for XOR operation for the input signals, namely the first output signal SIG_(A XOR B) and the carry input signal SIG_$C_{IN}$, is implemented by taking one of the input signals as the output signal, namely the first output signal SIG_(A XOR B) in this embodiment, in consideration of XOR relationship of the input signals.

As disclosed above and can be seen from TABLE 2 below, the sum signal SIG_SUM is the first output signal SIG_(A XOR B) when the carry input signal SIG_$C_{IN}$ is of value '0' corresponding to the logic "LOW" level. The sum signal SIG_SUM is the inverse of the first output signal SIG_(A XNOR B) when the carry input signal SIG_C$_{IN}$ is of value '1' corresponding to the logic "HIGH" level.

TABLE 2

| SIG_C$_{IN}$ | SIG_(A XOR B) | SIG_(A XNOR B) | C$_{IN}$ XOR (A XOR B) | SIG_SUM |
|---|---|---|---|---|
| 0 | 0 | 1 | 0 | 0 |
| 1 | 0 | 1 | 1 | 1 |
| 0 | 1 | 0 | 1 | 1 |
| 1 | 1 | 0 | 0 | 0 |
| 0 | 0 | 1 | 0 | 0 |
| 1 | 0 | 1 | 1 | 1 |
| 0 | 1 | 0 | 1 | 1 |
| 1 | 1 | 0 | 0 | 0 |

Figure 5:
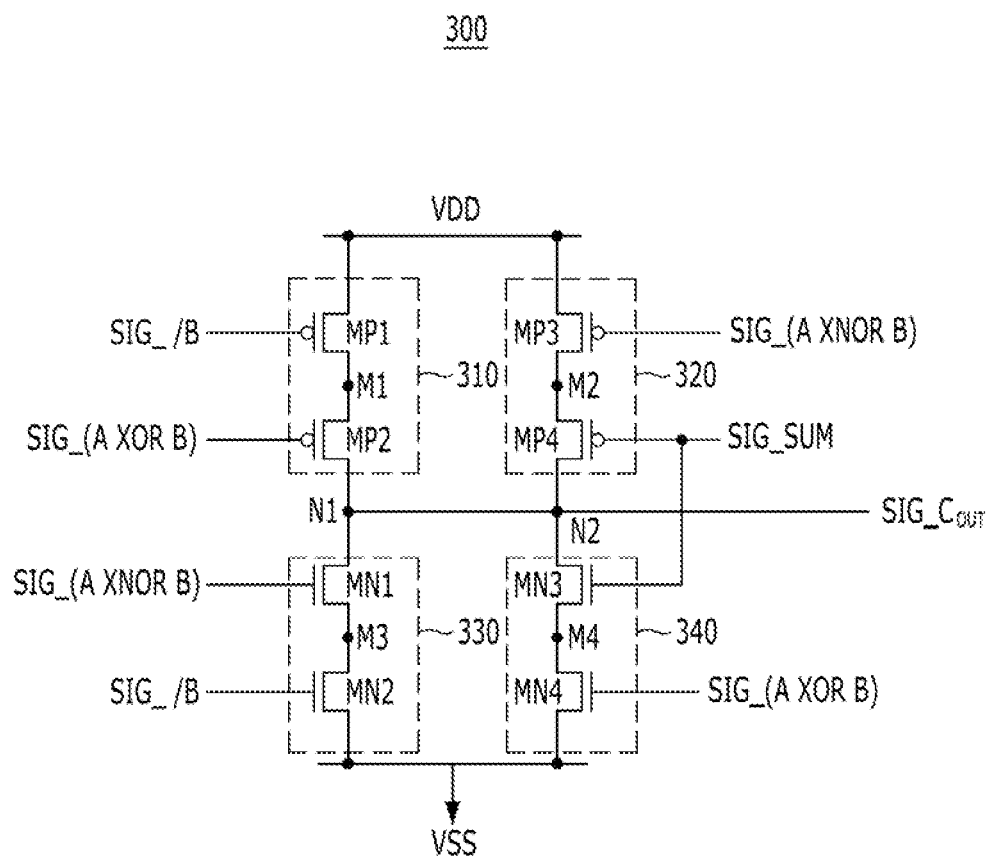
FIG. 5 is a circuit diagram illustrating a third logical operation unit in the full adder circuit of FIG. 2 in accordance with an exemplary embodiment of the present invention.

FIG. 5 is a circuit diagram illustrating the third logical operation unit 300 in the full adder circuit 500 of FIG. 2 in accordance with an exemplary embodiment of the present invention.

The third logical operation unit 300 may include first and second pull-up units 310 and 320, and first and second pull-down units 330 and 340.

The first and second pull-up units 310 and 320 are respectively connected to a power voltage VDD. The first and second pull-down units 330 and 340 are connected serially to the first and second pull-up units 310 and 320 at first and second nodes N1 and N2, respectively. The first and second pull-down units 330 and 340 are respectively grounded to a ground voltage VSS.

The first pull-up unit 310 is electrically disposed between the power voltage VDD and the first node N1, and pull-up drives the first node N1 in response to the inverse of the second input signal SIG_/B and the first output signal SIG_(A XOR B).

The first pull-up unit 310 may include a first PMOS transistor MP1 connected to the power voltage VDD and a second PMOS transistor MP2 serially connected to the first PMOS transistor MP1 at a first middle node M1. The first PMOS transistor MP1 may control electrical connection between the power voltage VDD and the first middle node M1, in response to the inverse of the second input signal SIG_/B. The second PMOS transistor MP2 may control electrical connection between the first middle node M1 and the first node N1, in response to the first output signal SIG_(A XOR B).

The inverse of the second input signal SIG_/B is input to the gate of the first PMOS transistor MP1. The source of the first PMOS transistor MP1 is connected to the power voltage VDD. The drain of the first PMOS transistor MP1 is connected to the first middle node M1. The first output signal SIG_(A XOR B) is input to the gate of the second PMOS transistor MP2. The source of the second PMOS transistor MP2 is connected to the first middle node M1. The drain of the second PMOS transistor MP2 is connected to the first node N1.

The second pull-up unit 320 is electrically disposed between the power voltage VDD and the second node N2, and pull-up drives the second node N2 in response to the inverse of the first output signal SIG_(A XNOR B) and the sum signal SIG_SUM.

The second pull-up unit 320 may include a third PMOS transistor MP3 connected to the power voltage VDD and a fourth PMOS transistor MP4 serially connected to the third PMOS transistor MP3 at a second middle node M2. The third PMOS transistor MP3 may control electrical connection between the power voltage VDD and the second middle node M2, in response to the inverse of the first output signal SIG_(A XNOR B). The fourth PMOS transistor MP4 may control electrical connection between the second middle node M2 and the second node N2, in response to the sum signal SIG_SUM.

The inverse of the first output signal SIG_(A XNOR B) is input to the gate of the third PMOS transistor MP3. The source of the third PMOS transistor MP3 is connected to the power voltage VDD. The drain of the third PMOS transistor MP3 is connected to the second middle node M2. The sum signal SIG_SUM is input to the gate of the fourth PMOS transistor MP4. The source of the fourth PMOS transistor MP4 is connected to the second middle node M2. The drain of the fourth PMOS transistor MP4 is connected to the second node N2.

The first pull-down unit 330 is electrically disposed between the first node N1 and the ground voltage VSS, and pull-down drives the first node N1 in response to the inverse of the first output signal SIG_(A XNOR B) and the inverse of the second input signal SIG_/B.

The first pull-down unit 330 may include a first NMOS transistor MN1 connected to the first node N1 and a second NMOS transistor MN2 serially connected to the first NMOS transistor MN1 at a third middle node M3. The first NMOS transistor MN1 may control electrical connection between the first node N1 and the third middle node M3, in response to the inverse of the first output signal SIG_(A XNOR B). The second NMOS transistor MN2 may control electrical connection between the third middle node M3 and the ground voltage VSS, in response to the inverse of the second input signal SIG_/B.

The inverse of the first output signal SIG_(A XNOR B) is input to the gate of the first NMOS transistor MN1. The source of the first NMOS transistor MN1 is connected to the first node N1. The drain of the first NMOS transistor MN1 is connected to the third middle node M3. The inverse of the second input signal SIG_/B is input to the gate of the second NMOS transistor MN2. The source of the second NMOS transistor MN2 is connected to the third middle node M3. The drain of the second NMOS transistor MN2 is connected to the ground voltage VSS.

The second pull-down unit 340 is electrically disposed between the second node N2 and the ground voltage VSS, and pull-down drives the second node N2 in response to the sum signal SIG_SUM and the first output signal SIG_(A XOR B).

The second pull-down unit 340 may include a third NMOS transistor MN3 connected to the second node N2 and a fourth NMOS transistor MN4 serially connected to the third NMOS transistor MN3 at a fourth middle node M4. The third NMOS transistor MN3 may control electrical connection between the second node N2 and the fourth middle node M4, in response to the sum signal SIG_SUM. The fourth NMOS transistor MN4 may control electrical connection between the fourth middle node M4 and the ground voltage VSS, in response to the first output signal SIG_(A XOR B).

The sum signal SIG_SUM is input to the gate of the third NMOS transistor MN3. The source of the third NMOS transistor MN3 is connected to the second node N2. The drain of the third NMOS transistor MN3 is connected to the fourth middle node M4. The first output signal SIG_(A XOR B) is input to the gate of the fourth NMOS transistor MN4. The source of the fourth NMOS transistor MN4 is connected to the fourth middle node M4. The drain of the fourth NMOS transistor MN4 is connected to the ground voltage VSS.

The carry output signal SIG_C$_{OUT}$ is output from either one of the first and second nodes N1 and N2. The carry output signal SIG_C$_{OUT}$ is the voltage level of the first node N1 pull-up or pull-down driven by the first pull-up and pull-down units 310 and 330, or the voltage level of the second node N2 by the second pull-up and pull-down units 320 and 340.

In detail, there is provided a current path between the power voltage VDD and the first node N1 when the inverse of the second input signal SIG_/B and the first output signal SIG_(A XOR B) with the logic "LOW" levels are input to the gates of the first and second PMOS transistors MP1 and MP2, respectively. The current path makes the level of the carry output signal SIG_$C_{OUT}$ the logic "HIGH" at the first node N1.

There is provided a current path between the first node N1 and the ground voltage VSS when the inverse of the first output signal SIG_(A XNOR B) and the inverse of the second input signal SIG_/B with the logic "HIGH" levels are input to the gates of the first and second NMOS transistors MN1 and MN2, respectively. The current path makes the level of the carry output signal SIG_$C_{OUT}$ the logic "LOW" at the first node N1.

There is provided a current path between the power voltage VDD and the second node N2 when the inverse of the first output signal SIG_(A XNOR B) and the sum signal SIG_SUM with the logic "LOW" levels are input to the gates of the third and fourth PMOS transistors MP3 and MP4, respectively. The current path makes the level of the carry output signal SIG_$C_{OUT}$ the logic "HIGH" level at the second node N2.

There is provided a current path between the second node N2 and the ground voltage VSS when the sum signal SIG_SUM and the first output signal SIG_(A XOR B) with the logic "HIGH" levels are input to the gates of the third and fourth NMOS transistors MN3 and MN4, respectively. The current path makes the level of the carry output signal SIG_$C_{OUT}$ the logic "LOW" at the first node N2.

TABLE 3 below is a logic table of the third logical operation unit 300.

TABLE 3

| SIG_/B | SIG_(A XOR B) | SIG_(A XNOR B) | SIG_SUM | SIG_$C_{OUT}$ |
|---|---|---|---|---|
| 1 | 0 | 1 | 0 | 0 |
| 1 | 1 | 0 | 1 | 0 |
| 0 | 1 | 0 | 1 | 0 |
| 0 | 0 | 1 | 0 | 1 |
| 1 | 0 | 1 | 1 | 0 |
| 1 | 1 | 0 | 0 | 1 |
| 0 | 1 | 0 | 0 | 1 |
| 0 | 0 | 1 | 1 | 1 |

As disclosed above and can be seen from TABLE 3, the third logical operation unit 300 outputs the carry output signal SIG_$C_{OUT}$ with the value '1' when the first output signal SIG_(A XOR B) and the inverse of the second input signal SIG_/B are input with the value '0', and when the inverse of the first output signal SIG_(A XNOR B) and the sum signal SIG_SUM are input with the value '0'.

On the other hand, the third logical operation unit 300 outputs the carry output signal SIG_$C_{OUT}$ with the value '0' when the inverse of the first output signal SIG_(A XNOR B) and the inverse of the second input signal SIG_/B are input with the value '1', and when the first output signal SIG_(A XOR B) and the sum signal SIG_SUM are input with the value '1'.

Accordingly, the full adder circuit 500 in accordance with an exemplary embodiment of the present invention, which outputs the carry value using the inverse of the input signals, may be implemented by totally 8 transistors. The full adder circuit 500 in accordance with an exemplary embodiment of the present invention may reduce the chip layout size and increase the data processing speed.

The full adder circuit 500 in accordance with an exemplary embodiment of the present invention may be implemented with pull-up logic and pull-down logic for variety of the carry value. For example, the full adder circuit 500 in accordance with an exemplary embodiment of the present invention may be used for pull-up logic for the carry value of '1' whereas used for pull-down logic for the carry value of '0'. The full adder circuit 500 in accordance with an exemplary embodiment of the present invention may be applied to a multiplier for optimization of the multiplier. Further, the full adder circuit 500 in accordance with an exemplary embodiment of the present invention may be applied to ail the semiconductor devices including a memory device.

While the present invention has been described with respect to the specific embodiments, it will be apparent to those skilled in the art that various changes and modifications may be made without departing from the spirit and scope of the invention as defined in the following claims.

What is claimed is:

1. A full adder circuit, comprising:
    a first logical operation unit suitable for outputting an inverse of the second input signal and a first output signal corresponding to either a second input signal or the inverse of the second input signal in response to a first input signal;
    a second logical operation unit suitable for outputting an inverse of the first output signal and a sum signal corresponding to either the first output signal or the inverse of the first output signal in response to a carry input signal; and
    a third logical operation unit suitable for outputting a carry output signal in response to the inverse of the second input signal, the first output signal, the inverse of the first output signal, and the sum signal.

2. The full adder circuit of claim 1, wherein the first logical operation unit is suitable for performing XOR operation for the first input signal and the second input signal.

3. The full adder circuit of claim 1, wherein the first logical operation unit includes:
    a first inverter suitable for inverting the first input signal to output the inverse of the first input signal;
    a second inverter suitable for inverting the second input signal to output the inverse of the second input signal;
    a first transmission gate suitable for outputting the second input signal as the first output signal in response to the first input signal and the inverse of the first input signal; and
    a second transmission gate suitable for outputting the inverse of the second input signal as the first output signal in response to the first input signal and the inverse of the first input signal.

4. The full adder circuit of claim 1, wherein the second logical operation unit is suitable for performing XOR operation for the first output signal and the carry input signal.

5. The full adder circuit of claim 1, wherein the second logical operation unit includes:
    a third inverter suitable for inverting the carry input signal to output the inverse of the carry input signal;
    a fourth inverter suitable for inverting the first output signal to output the inverse of the first output signal;
    a third transmission gate suitable for outputting the first output signal as the sum signal in response to the carry input signal and the inverse of the carry input signal; and a fourth transmission gate suitable for outputting the inverse of the first output signal as the sum signal in response to the carry input signal and the inverse of the carry input signal.

6. The full adder circuit of claim 1, wherein the third logical operation unit includes:
   a first pull-up unit electrically disposed between a power voltage and a first node and suitable for pull-up driving the first node in response to the inverse of the second input signal and the first output signal;
   a second pull-up unit electrically disposed between the power voltage and a second node and suitable for pull-up driving the second node in response to the inverse of the first output signal and the sum signal;
   a first pull-down unit electrically disposed between the first node and a ground voltage and suitable for pull-down driving the first node in response to the inverse of the first output signal and the inverse of the second input signal; and
   a second pull-down unit electrically disposed between the second node and the ground voltage and suitable for pull-down driving the second node in response to the sum signal and the first output signal, and
   wherein the first node and the second node are respectively disposed between the power voltage and the ground voltage.

7. The full adder circuit of claim 6, wherein the carry output signal is the voltage level of the first node driven by the first pull-up and pull-down units.

8. The full adder circuit of claim 6, wherein the carry output signal is the voltage level of the second node driven by the second pull-up and pull-down units.

9. The full adder circuit of claim 6, wherein the first pull-up unit includes:
   a first PMOS transistor suitable for controlling electrical connection between the power voltage and a first middle node in response to the inverse of the second input signal; and
   a second PMOS transistor suitable for controlling electrical connection between the first middle node and the first node in response to the first output signal, and
   wherein the first middle node is disposed between the power voltage and the first node.

10. The full adder circuit of claim 6, wherein the second pull-up unit includes:
    a third PMOS transistor suitable for controlling electrical connection between the power voltage and a second middle node in response to the inverse of the first output signal; and
    a fourth PMOS transistor suitable for controlling electrical connection between the second middle node and the second node in response to the sum signal, and
    wherein the second middle node is disposed between the power voltage and the second node.

11. The full adder circuit of claim 6, wherein the first pull-down unit includes:
    a first NMOS transistor suitable for controlling electrical connection between the first node and a third middle node in response to the inverse of the first output signal; and
    a second NMOS transistor suitable for controlling electrical connection between the third middle node and the ground voltage response to the inverse of the second input signal, and
    wherein the third middle node is disposed between the first node and the ground voltage.

12. The full adder circuit of claim 6, wherein the second pull-down unit includes:
    a third NMOS transistor suitable for controlling electrical connection between the second node and a fourth middle node in response to the sum signal; and
    a fourth NMOS transistor suitable for controlling electrical connection between the fourth middle node and the ground voltage in response to the first output signal, and
    wherein the fourth middle node is disposed between the second node and the ground voltage.

13. A semiconductor device, comprising:
    a first logical operation unit suitable for outputting an inverse of the second input signal and a first output signal corresponding to either a second input signal or the inverse of the second input signal in response to a first input signal;
    a second logical operation unit suitable for outputting an inverse of the first output signal and a sum signal corresponding to either the first output signal or an inverse of the first output signal in response to a carry input signal; and
    a third logical operation unit suitable for outputting a carry output signal in response to the inverse of the second input signal, the first output signal, the inverse of the first output signal, and the sum signal.

14. The semiconductor device of claim 13, wherein the first logical operation unit includes:
    a first inverting unit suitable for inverting the first input signal to output the inverse of the first input signal;
    a second inverting unit inverting the second input signal to output the inverse of the second input signal;
    a first switching unit outputting the second input signal as the first output signal in response to the first input signal and the inverse of the first input signal; and
    a second switching unit suitable for outputting the inverse of the second input signal as the first output signal in response to the first input signal and the inverse of the first input signal.

15. The semiconductor device of claim 13, wherein the first logical operation unit is suitable for XOR operation for the first signal and the second input signal.

16. The semiconductor device of claim 13, wherein the second logical operation unit includes:
    a third inverting unit suitable for inverting the carry input signal to output the inverse of the carry input signal;
    a fourth inverting unit suitable for inverting the first output signal to output the inverse of the first output signal;
    a third switching unit suitable for outputting the first output signal as the sum signal in response to the carry input signal and the inverse of the carry input signal; and
    a fourth switching unit suitable for outputting the inverse of the first output signal as the sum signal in response to the carry input signal and the inverse of the carry input signal.

17. The semiconductor device of claim 13, wherein the second logical operation unit is suitable for performing XOR operation for the first output signal and the carry input signal.

18. The semiconductor device of claim 13, wherein the third logical operation unit includes:
    a first pull-up unit electrically disposed between a power voltage and a first node and suitable for pull-up driving the first node in response to the inverse of the second input signal and the first output signal;
    a second pull-up unit electrically disposed between the power voltage and a second node and suitable for pull-up driving the second node in response to the inverse of the first output signal and the sum signal;

a first pull-down unit electrically disposed between the first node and a ground voltage and suitable for pull-down driving the first node in response to the inverse of the first output signal and the inverse of the second input signal; and
a second pull-down unit electrically disposed between the second node and the ground voltage and suitable for pull-down driving the second node in response to the sum signal and the first output signal, and
wherein the first node and the second node are respectively disposed between the power voltage and the ground voltage.

19. The semiconductor device of claim 18, wherein the carry output signal is the voltage level of the first node driven by the first pull-up and pull-down units.

20. The semiconductor device of claim 18, wherein the carry output signal is the voltage level of the second node driven by the second pull-up and pull-down units.

\* \* \* \* \*